United States Patent [19]

Truckenbrod et al.

[11] Patent Number: 4,663,725
[45] Date of Patent: May 5, 1987

[54] MICROPROCESSOR BASED CONTROL SYSTEM AND METHOD PROVIDING BETTER PERFORMANCE AND BETTER OPERATION OF A SHIPPING CONTAINER REFRIGERATION SYSTEM

[75] Inventors: Gregory R. Truckenbrod, Fridley, Minn.; David A. Christiansen, Bloomington; Herbert S. Falk, Royal Oak, both of Mich.; Richard A. Johnson; Robert G. Colclaser, III, both of Murrysville, Pa.

[73] Assignee: Thermo King Corporation, Minneapolis, Minn.

[21] Appl. No.: 702,271

[22] Filed: Feb. 15, 1985

[51] Int. Cl.⁴ .................... G06F 15/20; G06F 15/46; F25B 29/00
[52] U.S. Cl. .................... 364/505; 364/507; 364/557; 165/26; 165/27
[58] Field of Search ............... 364/551, 505, 185, 131, 364/138, 552, 507, 550; 165/26, 27; 236/78 B, 78 D; 324/51, 537; 371/8, 14

[56] References Cited

U.S. PATENT DOCUMENTS

| | | | |
|---|---|---|---|
| 3,973,618 | 8/1976 | Naley et al. | 165/27 |
| 4,166,243 | 8/1979 | West et al. | 324/51 |
| 4,253,153 | 2/1981 | Bitterli et al. | 364/505 |
| 4,276,925 | 7/1981 | Palmieri | 364/505 |
| 4,307,335 | 12/1981 | Paulson | 324/651 |
| 4,325,223 | 4/1982 | Cantley | 364/551 |
| 4,325,224 | 4/1982 | Howland | 165/26 |
| 4,419,866 | 12/1983 | Howland | 165/26 |
| 4,429,829 | 2/1984 | Sutton | 236/78 B |
| 4,589,060 | 5/1986 | Zinsmeyer | 364/557 |

Primary Examiner—Gary Chin
Assistant Examiner—Danielle Laibowitz
Attorney, Agent, or Firm—D. R. Lackey

[57] ABSTRACT

A microprocessor based system monitors and controls a transport refrigeration system having a two speed compressor coupled to a condenser and an evaporator and further having two speed condenser and evaporator fans, a refrigerant modulating valve, and heater means to cool or heat a served space. A keypad is provided for operator entry of the temperature setpoint and for display selections. Return air and discharge air temperature sensors provide signals to the microprocessor for temperature control. The microprocessor is programmed to sequence or control the compressor, the fans, the modulating valve and the heater means for temperature control in accordance with one of four stored algorithms. One of the temperature sensors is used for control, and if it is detected to have failed automatic switchover is made to use of the other temperature sensor for temperature control. Various input signals from the refrigeration system and from the microprocessor hardware are processed by the microprocessor to provide a data log and data for display and to detect system faults for fault history storage and for protective control action.

10 Claims, 14 Drawing Figures

MICROPROCESSOR BASED CONTROL SYSTEM AND METHOD PROVIDING BETTER PERFORMANCE AND BETTER OPERATION OF A SHIPPING CONTAINER REFRIGERATION SYSTEM

BACKGROUND OF THE INVENTION

The present invention relates to refrigeration systems for transport cargo space and especially to shipping container refrigeration systems and more particularly to control systems employing microprocessors so as to enhance the performance and managed operation of such refrigeration systems.

When a product that requires refrigeration is shipped, the shipper, the receiver, and the carrier all need to have assurances that the product will accurately and reliably be kept at the temperature required for the product during its transit time. Transport refrigeration systems and controls have been developed through the years for trucks, railroad cars and modular shipping containers to provide generally improving temperature control reliability and accuracy, better manufacturing and operating economy, greater operating flexibility and other performance objectives.

One example of a prior art system which provided progress in the art through improved mode and sequencing control is that which is set forth in U.S. Pat. No. 4,419,866 filed by Leland L. Howland on June 9, 1982 and assigned to the present assignee. This system employs analog circuitry including relays for implementing the control concepts involved. Numerous other prior art examples could be cited to illustrate incremental development in the transport refrigeration control art to the point where it is today.

In any case, a need continues to exist for further improvement in reliability and accuracy of transport space temperature control, and especially for the facility with which temperature control reliability and accuracy can be managed. This is especially true in the case of transportable container refrigeration systems, which, unlike refrigerated trucks, have no individually assigned attendant who can by observation become alerted to any unusual conditions or events which would effect control performance or operating reliability.

Limited efforts have been made in the past to obtain benefits from applying microcomputer technology to the transport refrigeration art. For example, a computer based monitoring system is set forth in U.S. Pat. No. 4,234,926 entitled "System and Method for Monitoring and Diagnosing Faults in Environmentally Controlled Containers, Such System and Method Being Especially Adapted for Remote Computer Controlled Monitoring of Numerous Transportable Containers Over Existing On-Site Power Wiring" and filed on Dec. 5, 1978 by C. G. Wallace et al. and assigned to Sealand Service Inc. of Edison, NJ. That system provides extended information availability for operating management through fault diagnosis and remote computer data linking and other monitoring features.

To obtain still better manageability and better product reliability and performance, it is desirable that an application of microcomputer technology by made to transport refrigeration systems with greater depth and scope so that more flexible, accurate, and reliable space temperature control and data monitoring can be achieved than has heretofore been the case.

SUMMARY OF THE INVENTION

A system is provided for operating a transport refrigeration system having a motor driven compressor coupled to a condenser and an evaporator and further having evaporator and condenser fans and a modulating refrigerant valve and heater means for heating or cooling a served space. Temperature sensing means is provided for sensing the temperature in a first portion of the served space. A microprocessor monitors and controls the transport refrigeration system.

Means are provided for coupling the microprocessor to operating controls for the compressor motor, the fans, the modulating valve and the heater means to provide the cooling and heating needed for space temperature control in accordance with a space temperature setpoint. The microprocessor is operated to sequence or control the refrigeration system operating controls in accordance with a selected one of a plurality of control algorithms which define in accordance with respective sets of rules the operating state of each of the operating controls to produce a level of heat transfer to or from the served space on the basis of the level of the error difference between the setpoint and sensed space temperatures.

Each of the algorithms defines the off/on state and the speed of the compressor motor and the fans and the off/on state of the heater means and the position of the modulating valve to produce modulating, partial or full cooling or a null condition or heating in accordance with the level and sign of the temperature error as defined in its set of rules. Means are preferably provided for operating the microprocessor for switching from one of the control algorithms to another of the control algorithms so that the sequence and control means can operate the microprocessor to run the refrigeration system under different sets of control procedures and/or with different sets of system components.

DESCRIPTION OF THE PREFERRED EMBODIMENT

Figure 1:
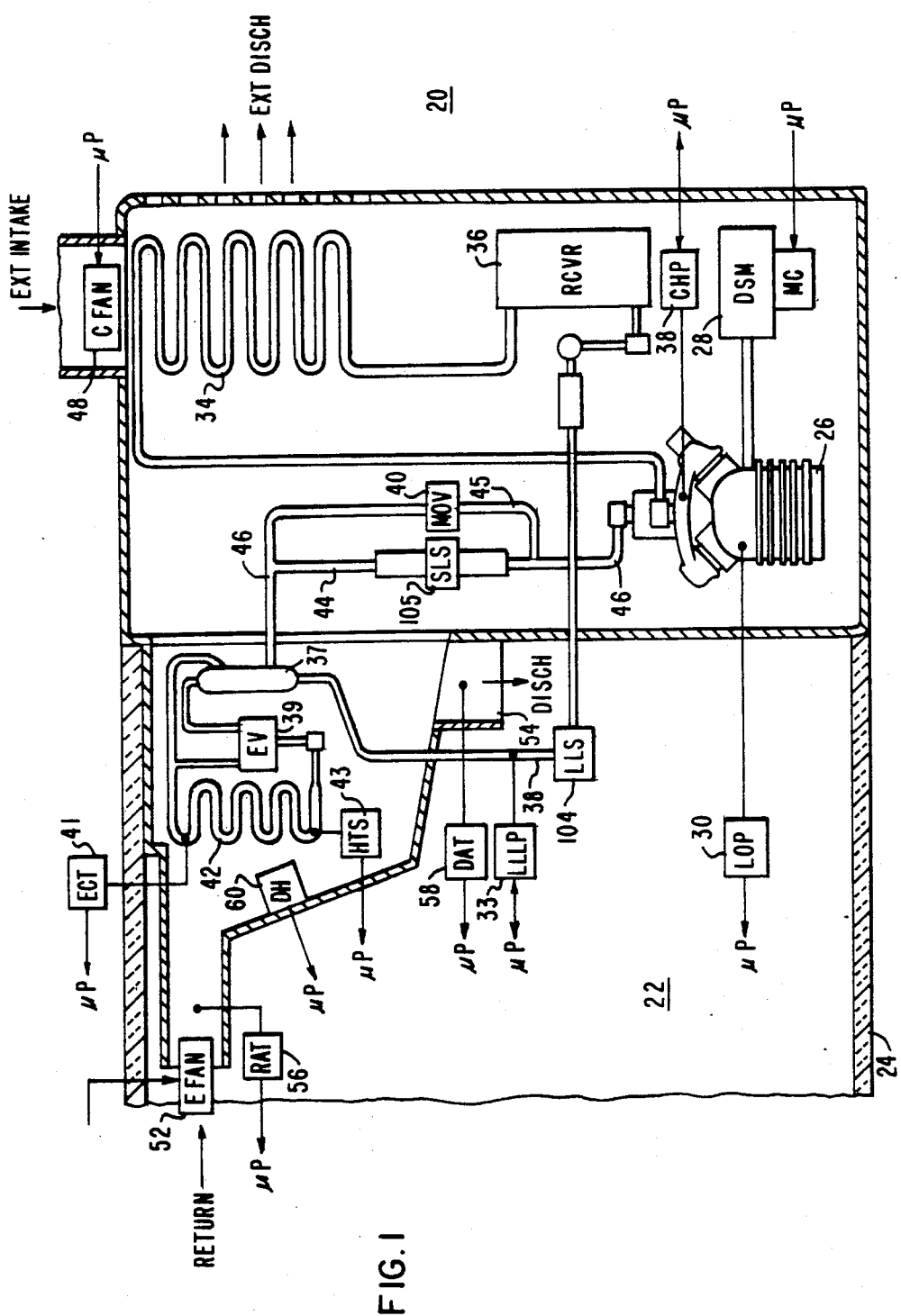
FIG. 1 shows a schematic view of the main parts of a transport refrigeration system of one of various types to which the invention can be applied.

More particularly, there is shown in FIG. 1 a transport refrigeration system 20 having a conventional configuration for cooling or heating served space 22 within an insulated shipping container 24 or, if desired, a transport trailer or railroad car or the like. The refrigerant system is operated with improved performance and improved manageability through various control system interface components many of which are shown in FIG. 1. To provide clarity in the invention description through elimination of unnecessary conventional detail, most refrigerant and control components are shown schematically.

In the refrigerant system 20, a conventional compressor 26 is driven by a dual speed electric motor 28 under computer control. An oil pressure sensor 30 generates a signal when the compressor oil pressure is low.

During cooling operation, the hot refrigerant gas is discharged through a line 32 to a condenser 34 where it is cooled and condensed and flows to a receiver tank 36 and then through a liquid line 38 to a heat exchanger 37 and thereafter through an expansion valve 39 to an evaporator 42 where it is heated. The return flow passes through the heat exchanger 37 to a suction line 46 to the compressor 26.

Respective pressure sensors 33 and 35 produce computer data signals when the refrigerant pressure within is low within the liquid suction line or high within the compressor.

The suction line 46 includes two parallel branch lines 44 and 45. A suction line solenoid valve 105 provides on/off flow control in the branch line 44. A modulating valve 40 provides modulating flow control under computer direction in the branch line 45.

The modulating valve 40 is a conventional device that is provided with a suitable electrically operated positioning mechanism which controls the size of the flow opening in the refrigerant flow path thereby providing fine or modulating cooling control. The refrigerant flow is varied from a designated minimum flow, at 90% closed for example, to maximum capacity flow at full open over the control range.

Since the condenser in this case is air cooled, external air is directed across the coils of the condenser 34 by a two speed condenser fan 48 and the heated exhaust air is discharged through an outlet 50. A two speed evaporator fan 52 directs return air from the served space across the evaporator 42 and the cooled air is discharged to the served space 22 through an outlet 54.

Respective temperature sensors 56 and 58 generate computer signals indicating the return and discharge temperatures for the served space air. An evaporator high temperature sensor 41 is also computer coupled.

An electric heater 60 is placed under computer control to defrost the evaporator coils with the evaporator fan 52 turned off. To heat the served space 22, the electric heater 60 and the evaporator fan 52 are both turned on with the compressor 26 off.

CONFIGURATION OF THE CONTROL SYSTEM

Figure 2:
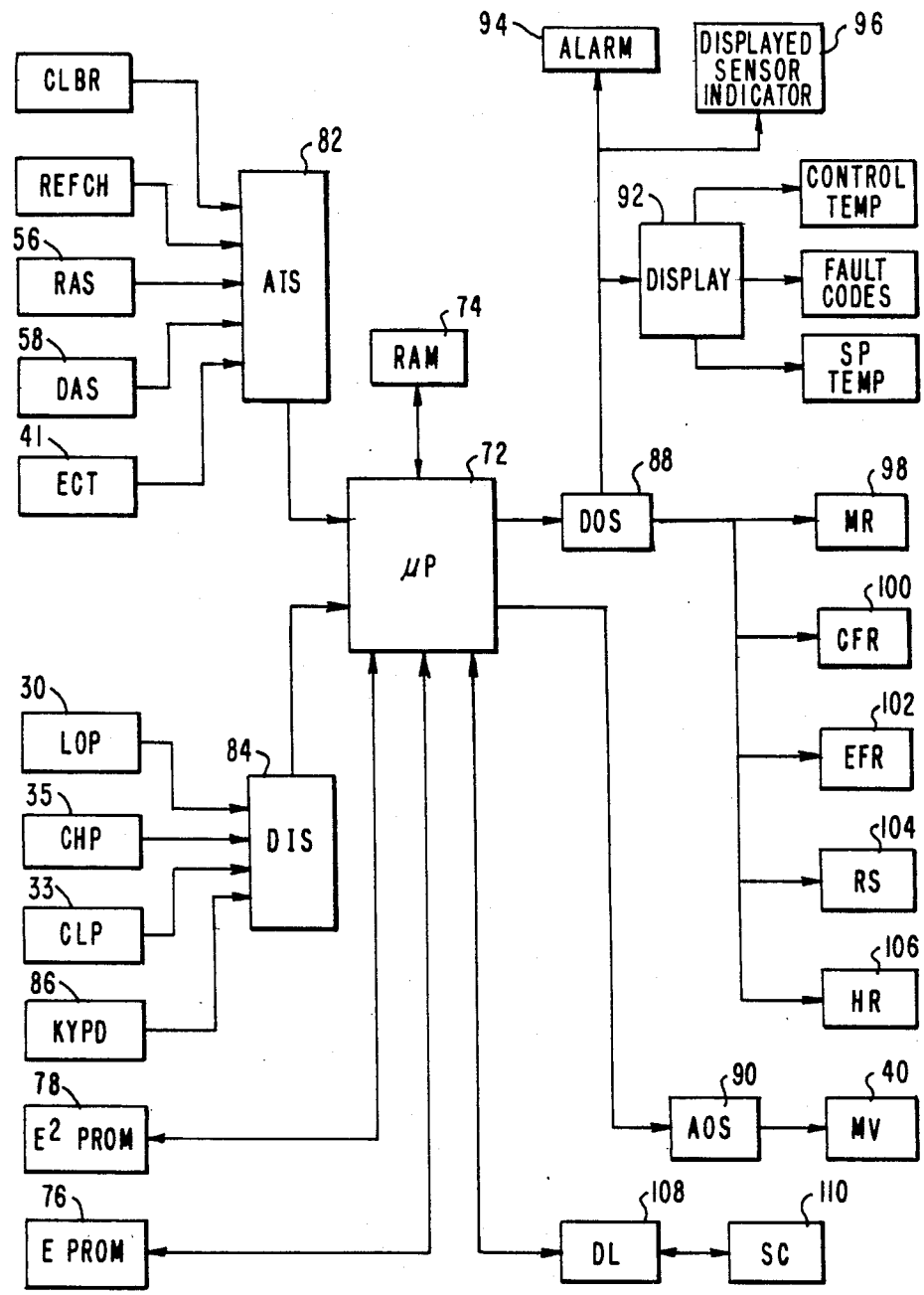
FIG. 2 shows a schematic block diagram of a microcomputer based control system which operates the transport refrigeration system of FIG. 1 in accordance with the principles of the invention.

A control system 70 is provided as shown in FIG. 2 for operating the transport refrigeration system 20 of FIG. 1 in accordance with the principles of the invention. A microprocessor 72 such as an Intel 8051 is employed to provide system control and data processing. As shown schematically, three separate memory sections are used in the operation of the microprocessor 72. A volatile RAM memory 74 provides storage for working data while an EPROM memory 76 provides nonvolatile and nonchangeable storage of programs used in the computer operation. An E²PROM memory 78 operates more slowly than the RAM memory 74 but it provides nonvolatile changeable memory for setpoints, fault codes and log data.

Signal inputs are provided for the computer 72 through a conventional analog input system 82 and a conventional digital input system 84. The principal analog input are respective signals from the evaporator return and discharge air temperature sensors 56 and 58 employed in space temperature control and a signal from the evaporator temperature sensor 41 used in defrost control. In addition, system internal inputs include those from a reference channel 86 and a calibration channel 88 which are used for checking and alignment purposes.

The reference channel 86 verifies the operation of the analog to digital conversion circuitry. As generally known, the computer 72 periodically checks the reference channel input against a set of limits. If the limits are exceeded, an internal problem is presumed and the system is shut down.

The calibration channel 88 is employed to provide field calibration of the three temperature sensors, i.e. the return air sensor 56, the discharge air sensor 58 and the evaporator coil temperature sensor 41. Generally, calibration is needed to accommodate manufacturing variations from sensor unit to sensor unit, and it is achieved by determining for use in the computer an offset value corresponding to the difference between the sensor output and a known reference output at a known temperature condition.

Input digital signals, i.e. relay contact closures, are routed through the digital input system 84. These include signals from the pressure sensors 30, 33, and 35.

A keypad 87 is provided with five button switch inputs (not specifically shown) so that operator selections can be entered into the computer 72. These include a selection of the temperature sensor to be displayed, a selection of the temperature setpoint and a fault code display selection.

On the output side of the computer 72, a digital output system 89 and an analog output system 90 couple control outputs from the computer 72 to controlled devices in the refrigeration system 20. In addition, display and alarm signals generated by the computer 72 are routed to a display 92, an alarm indicator lamp 94, and to indicator lamps 96 for the temperature sensor being displayed. In this case, displays are provided respectively for setpoint temperature, discharge and return temperature and fault codes. The analog output system 90 generates a signal to drive the refrigerant modulating valve 40 to the computer command position.

The digital control outputs generally are employed to operate control relays in the various conventional circuits used to operate the compressor motor 28, the heater 60 and the dual speed evaporator and condenser fans 52 and 48, respectively.

The following is a list of the principal outputs:

| Output | Function |
| --- | --- |
| motor relays 98 | start/stop speed select |
| condenser fan relays 100 | start/stop speed select |
| evaporator fan relays 102 | start/stop speed select |
| heater relays 106 | heater on defrost: fan off heating: fan on/motor off |
| solenoid valve relays | liquid line - open/close |

| Output | Function |
| --- | --- |
| 104 & 105 | suction line - open/close |

A data link 108 is connected to the computer 72 through a bidirectional serial port so that data can be sent to and commands can be received from a supervisory computer 110. For example, data logging information can be transferred from the control computer 72 to the supervisory computer 110 for evaluation, documentation and history recording purposes. The supervisory computer can also be used to collect current control information as it develops and to check out the controller prior to loading the container 24 with its load. A high capacity central computer can be used as the supervisory computer where a large number of container refrigerant systems are being monitored such as on board a cargo ship. In any case a small notebook type computer can be used as the supervisory computer where a monitoring linkage is being established to a single refrigerant control system or to multiple control systems on a one by one basis.

ARCHITECTURE OF PROGRAM SYSTEM

Figure 3:
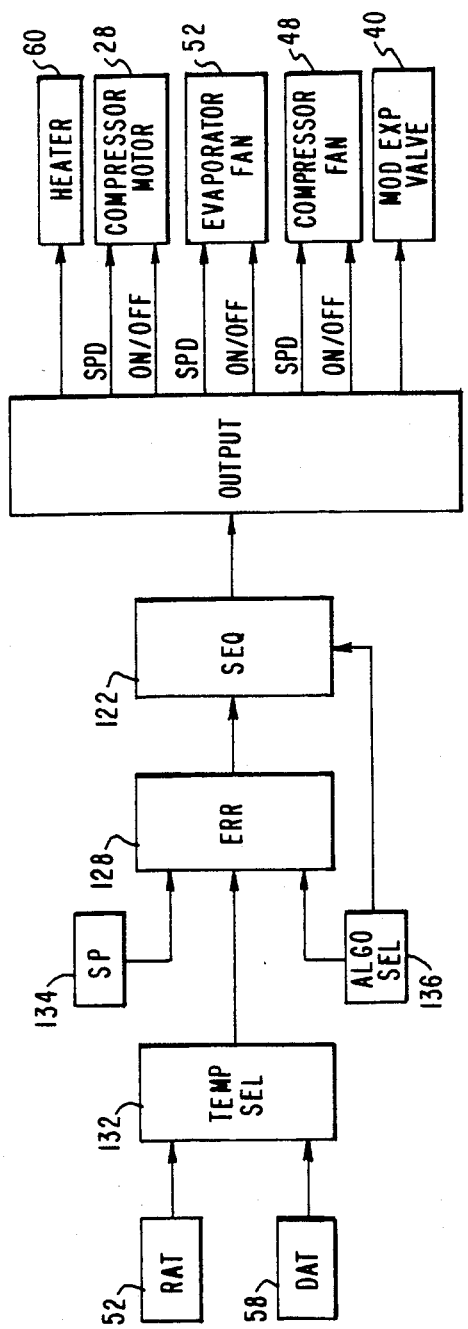
FIG. 3 shows a temperature control loop diagram for the control system of FIG. 2.

FIG. 3 shows a program system 120 arranged to control and monitor the refrigerant system 20 so as to provide better system performance and management in accordance with the principles of the invention.

System control is directed to producing a setpoint temperature in the served space 22 in the container 24. Signals are thus generated by the computer under program control to operate the compressor motor 28, the condenser and evaporator fans 48 and 52, the liquid and suction line solenoid valves 104 and 105, respectively, the modulating valve 40, and the heater 60. A control system state sequencer 122 operates on digital inputs from box 124, system fault inputs from a fault manager 126 (FIG. 3B), and a temperature error signal from an error generator 128. The digital inputs include contact closures which predefine one or more aspects of the sequence control such as an operator manual defrost select. In addition, an algorithm selection is identified to the sequencer 122 by the box 124.

Figure 3A:
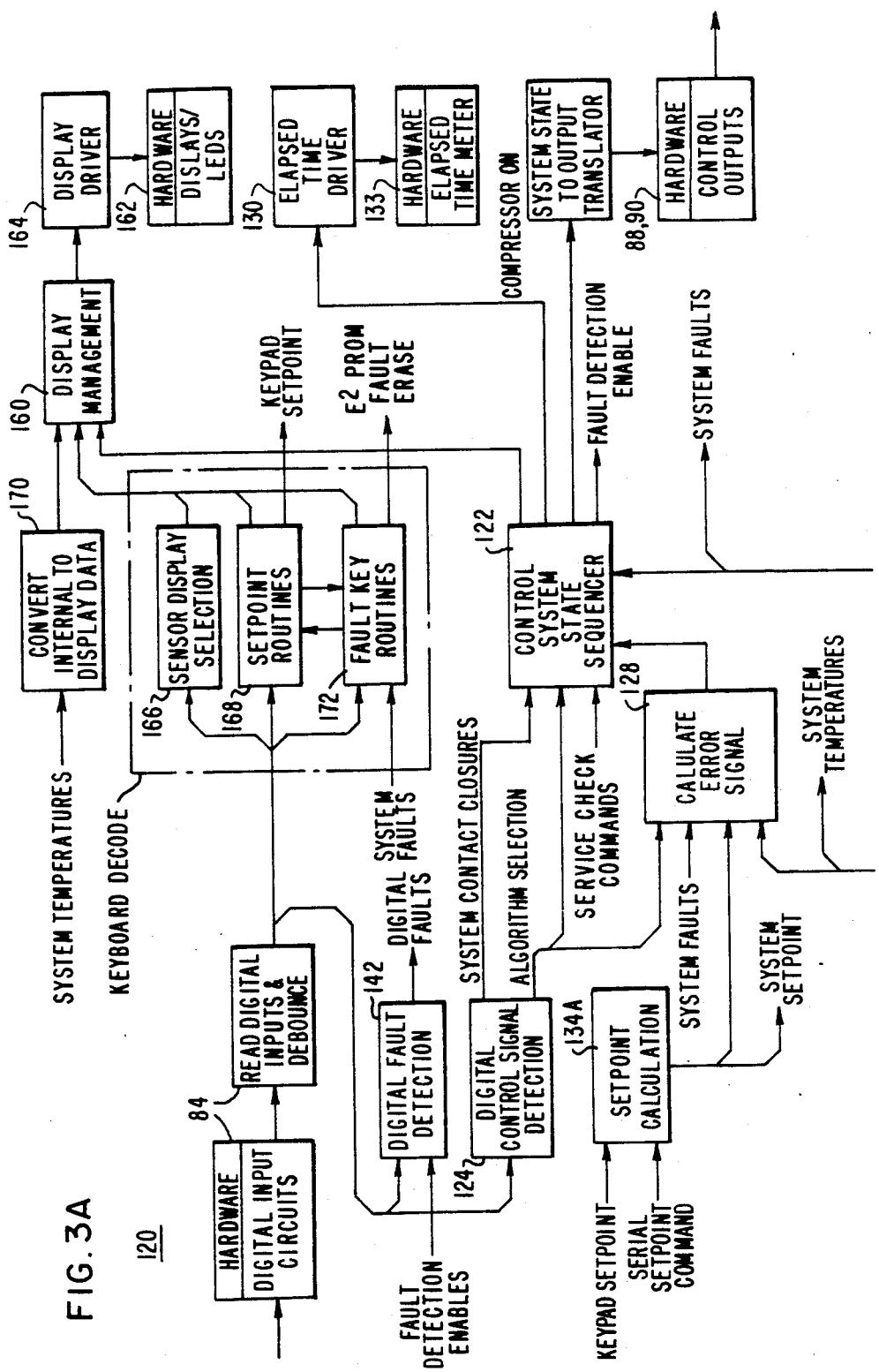
FIGS. 3A and 3B show a schematic block diagram of the architecture of a software system organized to operate the control system of FIG. 2 and the transport refrigeration system of FIG. 1 in accordance with the principles of the invention.

As shown in FIG. 3, the temperature control is exercised through a control loop 120. The return air and discharge air temperature sensors 56 and 58 are coupled to a temperature selector 132 which applies one of the temperature signals as an actual temperature input to the error generator 128. The temperature error is computed as the difference between an entered setpoint temperature 134 and the selected actual temperature input, and the level of the control action taken is set by the temperature error level as defined by the controlling algorithm. As shown in FIG. 3A, the setpoint temperature is calculated by a routine 134A according to a setpoint input from either the keypad or the serial data link.

Improved operation is realized through the temperature loop operation resulting from temperature sensor switching. Thus the operative temperature sensor 56 or 58 is algorithm controlled unless that sensor is detected to be defective in which case it is switched out of the control loop and the other sensor is made operative in the control loop.

Specifically, the computer employs its internal diagnostic routines to the input value from each of the two temperature sensors and if it is outside a specified range, it is presumed that the sensor has a fault such as a short or open.

The sequencer 122 operates under the direction of an algorithm preselected from a group of available algorithms, in this case four algorithms. The selected algorithm in effect defines the control outputs needed to achieve the setpoint temperature efficiently, accurately, and quickly on the basis of the present state of the system and known behavioral response of the system to the operation of the compressor, the fans, the refrigerant modulating valve and the heater.

The generated control outputs are then applied to the controlled devices to control on/off status, speed or position as indicated in FIG. 3. The sequenced state of the controlled devices remains fixed until a space temperature change results in a change in the state of one or more controlled devices under algorithm control or until a sensed fault requires shutdown or other action by the controlled devices. When the sequencer 122 starts the compressor motor 28, an elapsed time driver 130 shown in FIG. 3A is triggered to operate an external timer 133 until the motor is stopped thereby displaying compressor-on elapsed time for management purposes.

The algorithms that can be selected for control in this embodiment are graphically illustrated in FIGS. 4A–4D. Algorithm selection is made in any suitable manner, such as by external jumper settings as in this case, or by software control if desired in other cases. The intended use of the refrigerant system 20 normally would be determinative of the algorithm selected for control of the state sequencer 122.

Each algorithm has one part that applies to temperature setpoints equal to or greater than 24° F. and a second part that applies to temperature setpoints less than 24° F. The 24° F. temperature is a control departure point because below 24° F. the load is essentially frozen and it is desirable to keep it frozen whereas above 24° F. a specific temperature is normally to be maintained for a specific load such as 56° F. for lettuce.

In addition, each algorithm part has a set of procedures for falling temperatures and another set of procedures for rising temperatures. Generally, load temperature control is achieved under algorithm control by specification of the operating state of the compressor motor and its speed, the evaporator and condenser fans and their speeds, the liquid and suction line solenoids, and the refrigerant modulation valve. Thus, the controller detects the sensed space or load temperature, determines from an algorithm table what state it should be in relative to where it is and then steps through procedures which place the controlled devices in the states needed to drive the space temperature to the setpoint value.

Figure 4A:
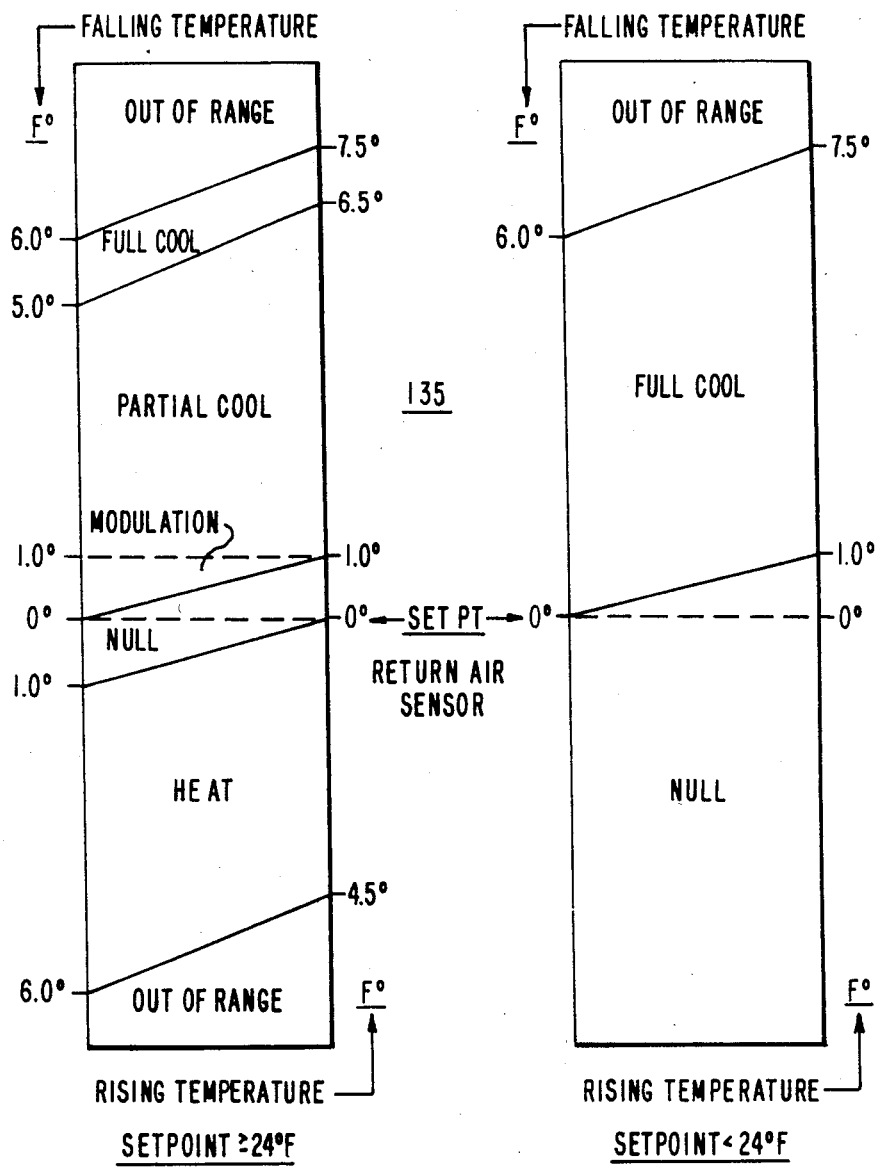
FIGS. 4A-4D show respective schematic diagrams of four different algorithms employed to determine the state of the control system of FIG. 2.

An algorithm 135 shown in FIG. 4A calls for the return air temperature sensor 56 and high speed for the evaporator fan 52 for temperature setpoints equal to or greater than 24° F. With a positive temperature error of +6° F. or more during falling temperature, the system is in full cooling (high compressor speed) but out of control range. For temperature errors in the range +3° to +6° F., full cooling is commanded. Partial cooling under low speed compressor operation is specified during falling temperature over the positive temperature error range +3° to +1° F. In the positive temperature error range +1°–0° F., refrigerant flow modulation is employed for control, i.e. the valve 40 is controlled to regulate the space temperature to the temperature setpoint with the compressor motor at low speed. For negative temperature errors from 0° F. error to −1° F. on falling temperature, the control is in a null state in which no cooling or heating action is taken. Heating is applied on falling temperature in the negative temperature error range −1° F. to −6° F., i.e. the compressor motor is turned off with the heater and the evaporator fan in the on state. Negative error temperatures greater than −6° F. are out of control range and the unit is off.

For rising temperature with a setpoint equal to or greater than 24° F., the unit is off for negative error temperatures greater than −4.5° F. and heating is applied in the negative error range −4.5° F. to 0° F. A null condition is specified for positive temperature errors in the range 0° F. to 1° F. while partial cooling is applied in the range 1° F. to 6.5° F. and full cooling is applied in the range 6.5° F. to 7.5° F. and for out-of-range temperature errors above 7.5° F.

The algorithm 135 provides full cooling for positive temperature errors and null for negative temperature errors for setpoints less than 24° F. on falling temperature. With rising temperature, full cooling is applied above positive temperature errors of 1° F. and null is applied for errors below 1° F.

Figure 4B:
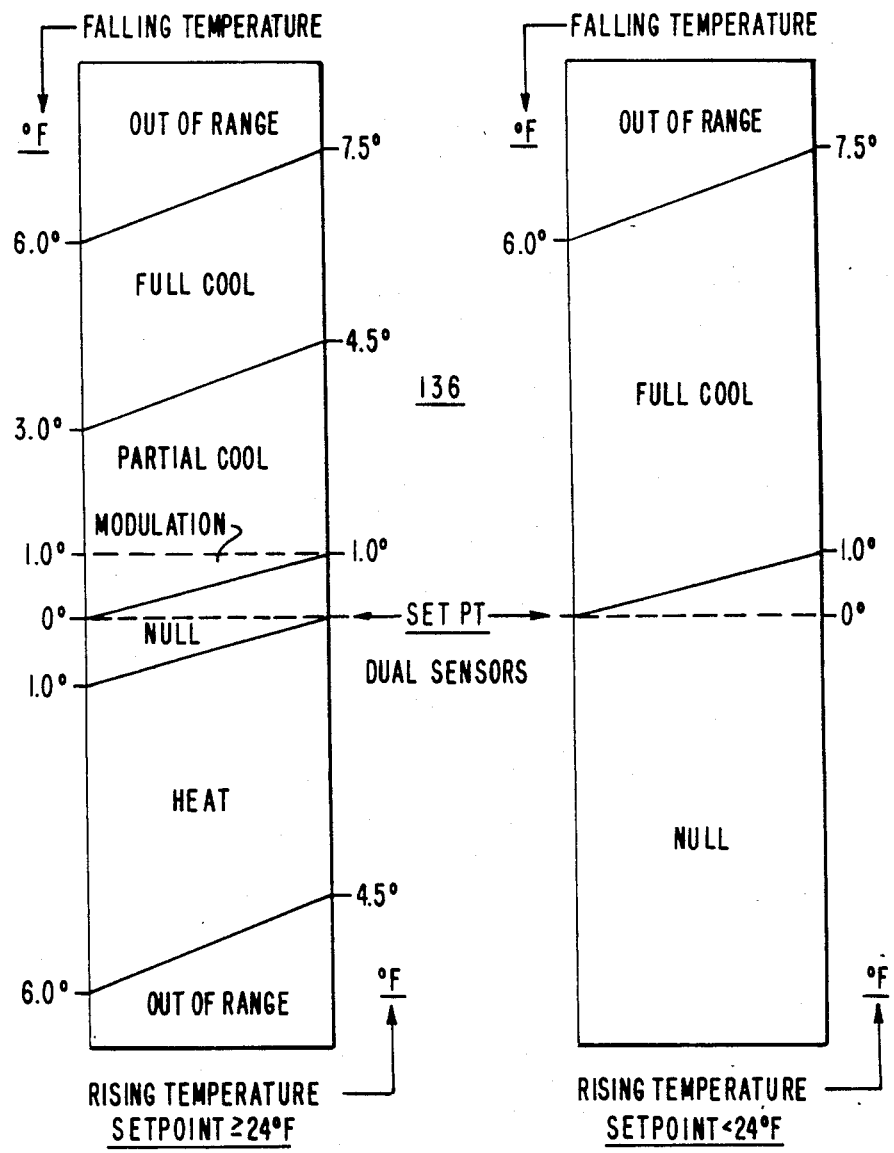
Figure 4C:
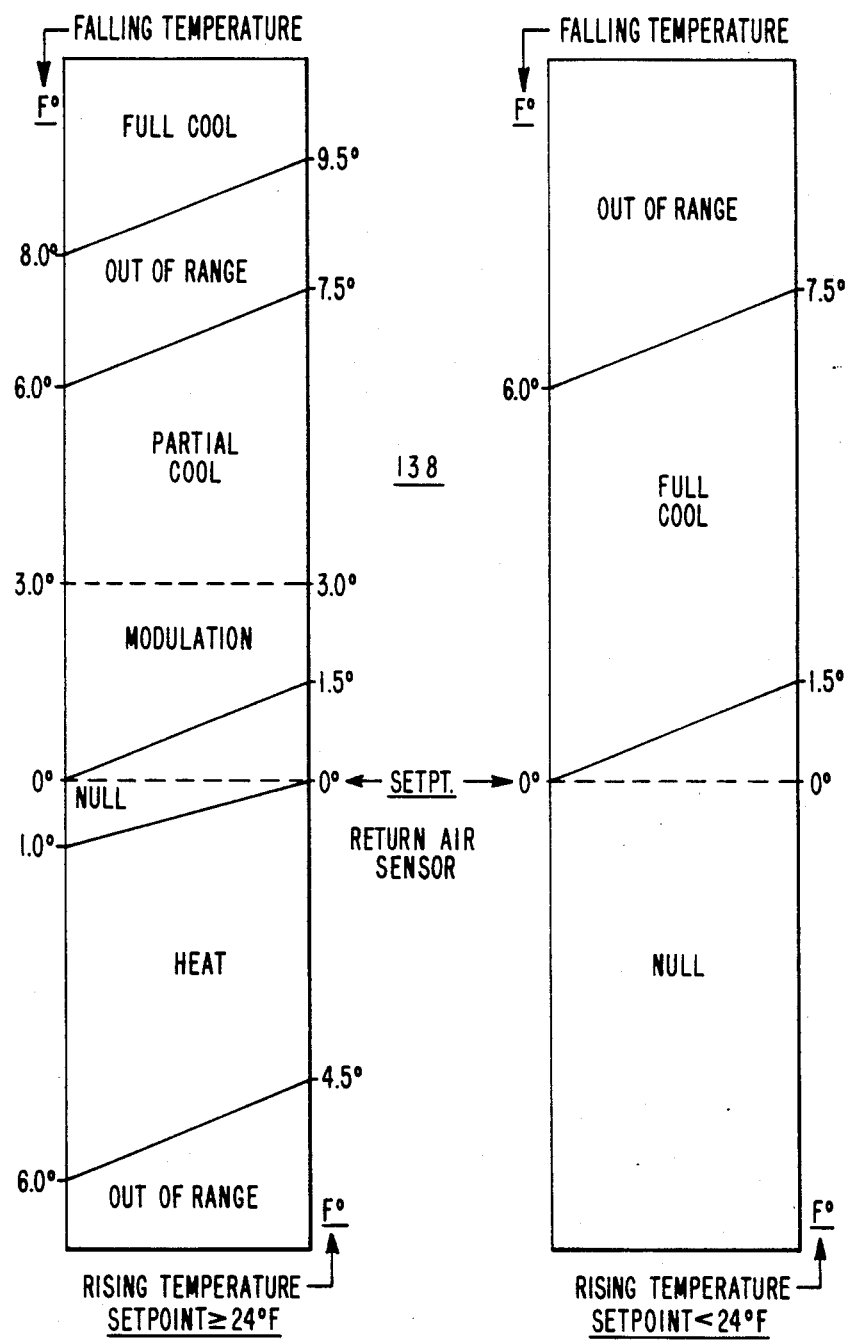
Figure 4D:
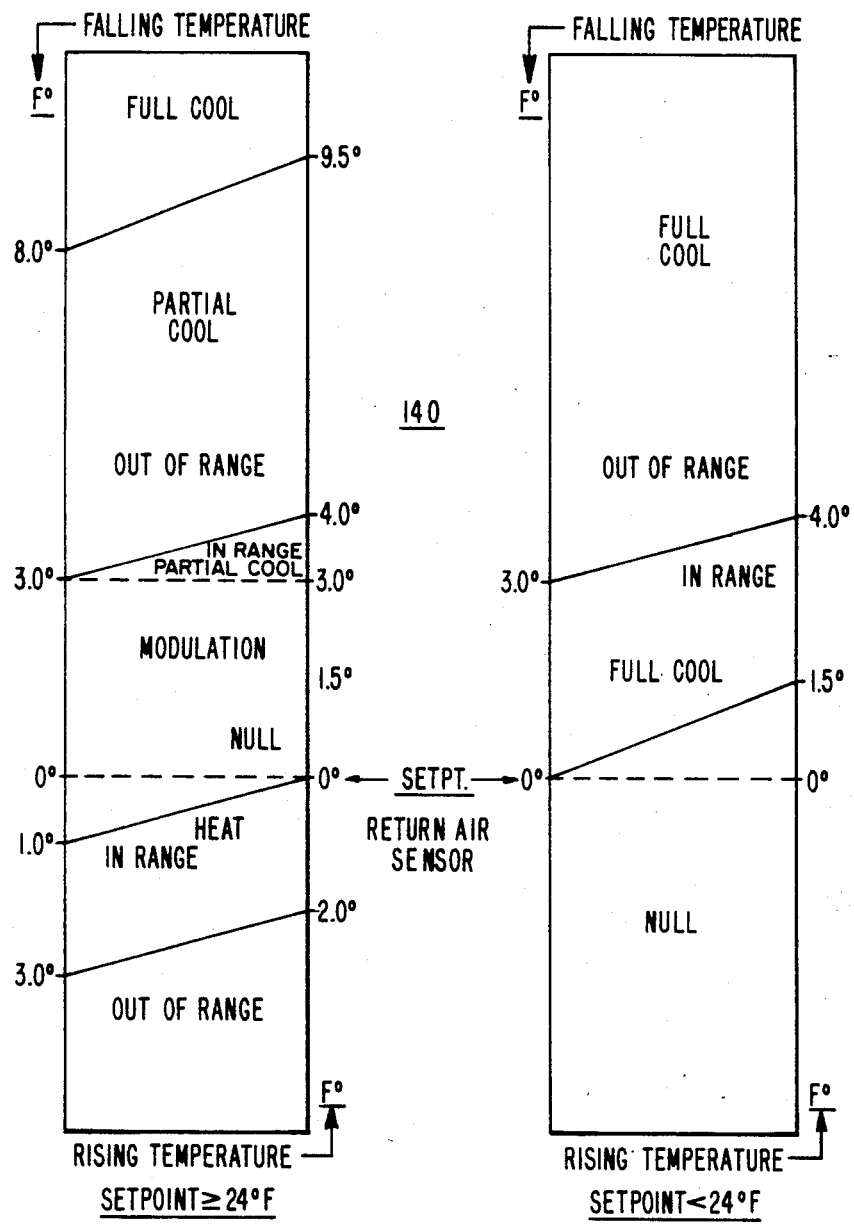

Three other algorithms 136, 138, and 140 are shown in FIGS. 4B, 4C and 4D. These algorithms provide for full cooling, partial cooling, modulation, null, heating or off condition for temperature error ranges as shown for rising or falling temperatures.

Algorithm 136 is employed where customers require control on the air discharged from the refrigeration unit for fresh loads to provide maximum protection against top freezing (fresh loads have setpoints above 24° F.). This algorithm uses the return air sensor for frozen loads.

The other algorithms 135, 138, 140 use return air control for both fresh and frozen loads. Return air control has been shown to provide faster pulldown for products loaded above the control temperature. The varying temperatures for mode changes are determined by customer equipment and preference.

In the previously referenced situation in which a failed temperature sensor is detected, the control system goes through a recovery procedure in switching from operation with the failed temperature sensor to operation with the other temperature sensor. For example, the system may be under the control of an algorithm that employs the return air sensor when a failure is detected for that sensor. Instead of triggering a shutdown, a backup recovery procedure is initiated and the discharge air sensor is made operative and a new or the same controlling algorithm is specified by the existing controlling algorithm. Thus, dynamic switching of algorithms occurs on temperature sensor failure.

Figure 5:
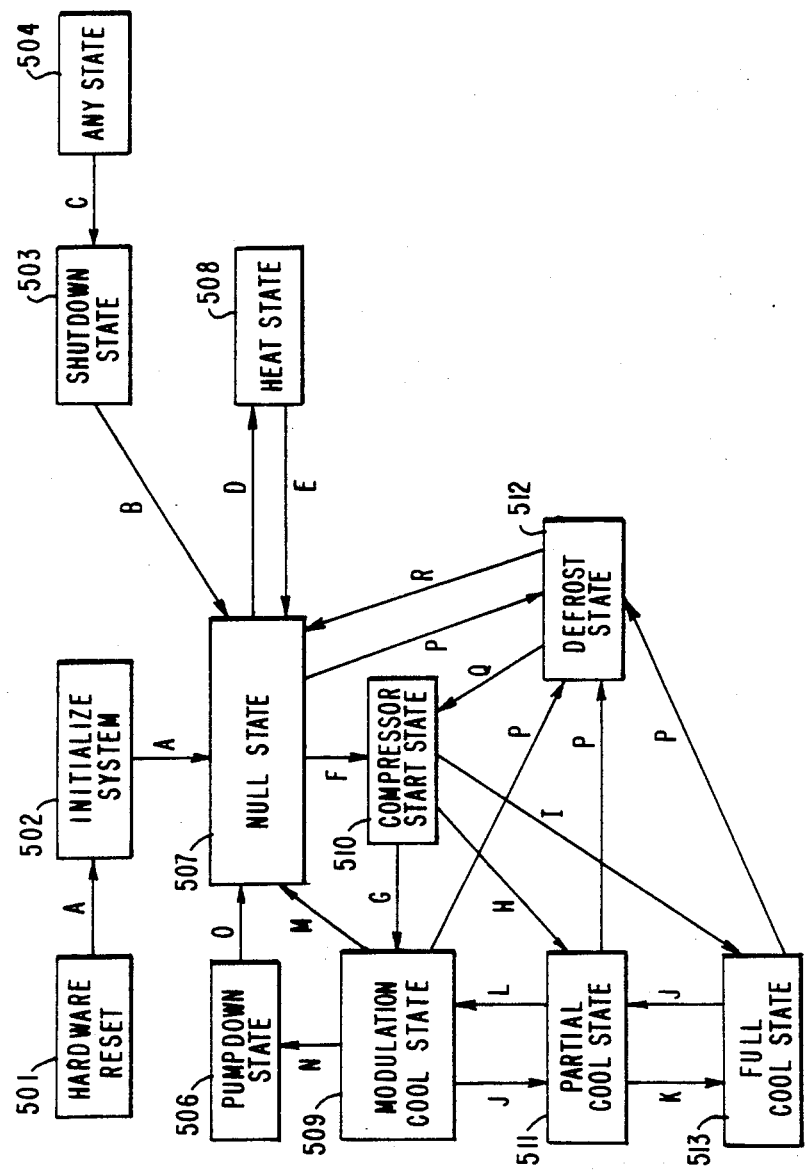
FIG. 5 shows a state transition diagram for the operation of the control system of FIG. 2.

A state transition diagram is shown in FIG. 5 to illustrate the system sequential operation in greater detail. Each state of operation is designated within a rectangular block and movement between states, under algorithm or operators or system control, is indicated by arrow connectors between the blocks. The start/stop states and various cooling, null and heating states are basically algorithm controlled. The following table provides an explanation of the lettered transition connections between states:

A. Always make transition
B. Alarm reset by operator
C. Shutdown fault condition exists
D. Error signal requests heat
E. Error signal requests null
Error signal requests cooling state
G. Error signal request modulation cool and compressor running
H. Error signal request partial cool and compressor running
I. Error signal request full cool and compressor running
J. Error signal request partial cool and compressor running
K. Error signal request full cool and compressor running
L. Error signal request modulation cool and compressor running
M. Error signal request null state and 2 speed compressor system
N. Error signal request null state and 1 speed compressor system
O. System pumpdown complete
P. Defrost requested
Q. Defrost complete and cooling state requested
R. Defrost complete and null state requested The algorithms define general states needed for temperature control and an algorithm command for a change from one state to another may imply one or more specific procedures needed to produce the change. Thus, with the use of a single speed compressor, turning the compressor off requires a pumpdown, i.e. that the compressor be turned off followed by a wait time period before it is turned back on at the lower or higher speed.

During pumpdown, the liquid line and suction line solenoids are deactivated to close the liquid line solenoid and open the suction line solenoid. The compressor is operated until low suction pressure is sensed at which time power is disconnected from the compressor motor. If not previously terminated, the pumpdown is terminated when a time limit is reached—in this case five minutes.

Defrost operation is based on two controlling factors. It is initiated on a time cycle such as once every four hours. It is also initiated under feedback control, i.e. defrost is started if the evaporator coil temperature sensor shows a temperature below 45° F. In the defrost cycle, the evaporator fan and compressor motor are turned off and the heater (resistance heating elements) is turned on. When the evaporator coil temperature rises above 56° F., the defrost cycle is ended. If the defrost cycle is not ended within forty-five minutes, a system fault is generated and alarmed and the defrost cycle is ended and cooling control is resumed. The next defrost cycle may also end in a system fault in which case the fault is alarmed and recorded and control is resumed. A defrost coil problem would be indicated for maintenance.

Control output relays are operated to establish the on/off state of the various controlled devices in accordance with the control actions of the state sequencer 122 as set forth in the following table:

| Control Device | DUAL SPEED COMPRESSOR DRIVE** | | | | | |
| --- | --- | --- | --- | --- | --- | --- |
| | Full Cool | Part. Cool | Mod. Cool | Null | Heat | Defrost |
| Compressor Contactor Low Speed | | X | X | | | |
| Compressor Contactor High Speed | X | | | | | |
| Heater Contactor | | | | | X | X |
| Condenser Fan Contactor High Speed | X | * | * | | | |
| Condenser Fan Contactor Low Speed | | * | * | | | |
| Evaporator Fan Contactor High Speed | >24° F. S.P. | X | X | >24° F. S.P. | X | |
| Evaporator Fan Contactor Low Speed | <24° F. S.P. | | | <24° F. S.P. | | |
| Liquid Line Solenoid | X | X | X | | | |
| Suction Line Solenoid | | X | X | | | |
| Modulation Valve | | | X | | | |

*Either High Speed or Low Speed condenser fan contactor is ON. Selection is controlled by a condenser fan pressure switch.
**A conventional rear panel jumper is employed to select a control option for a single speed compressor drive.

Figure 3B:
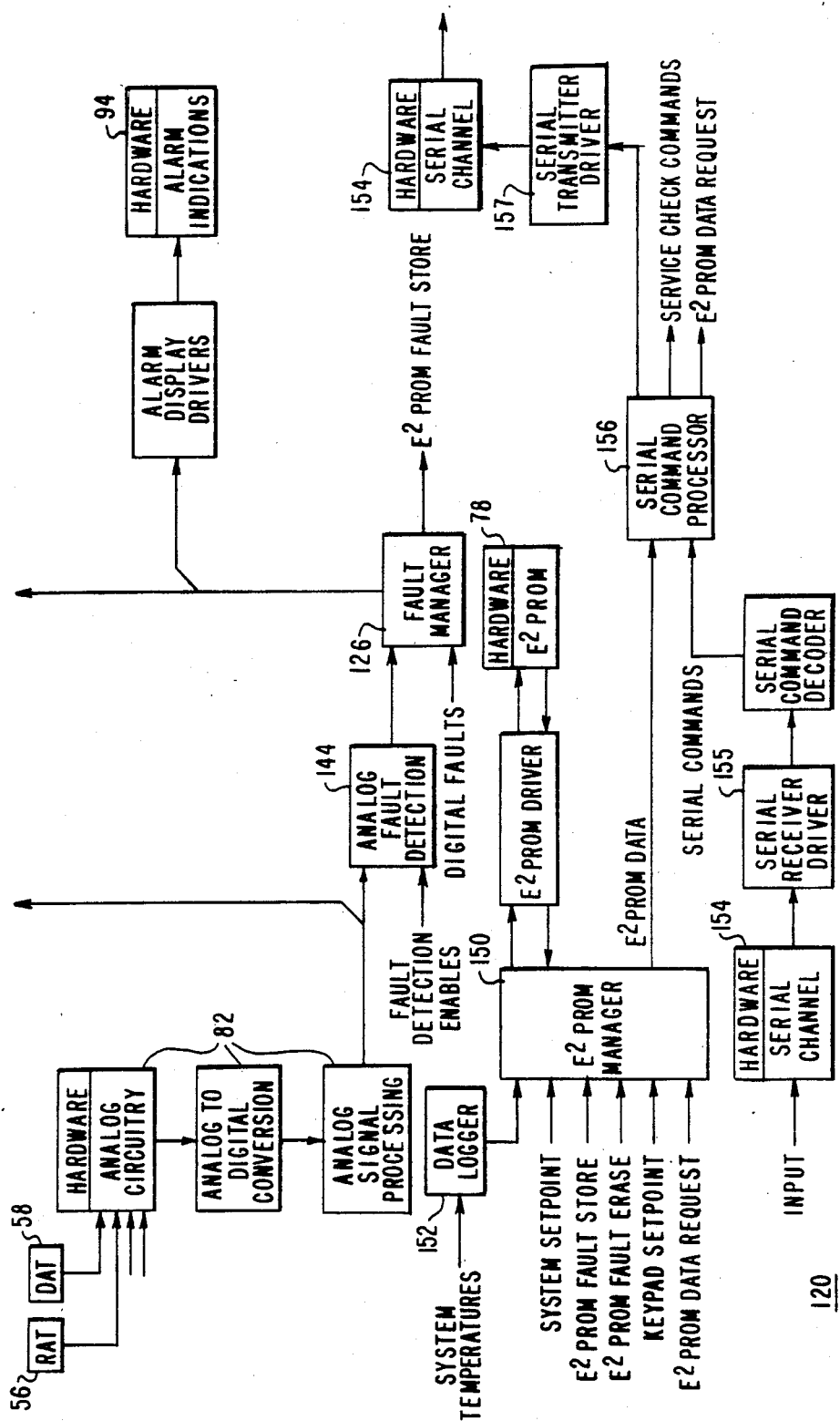

Referring to FIGS. 3A and 3B, the fault manager 126 cooperates with other elements of the system in processing detected system faults so that system operation is made more reliable, more flexible and more manageable. Digital faults are detected by a detector 142 to which system digital inputs are applied. Similarly, analog inputs are applied to a detector 144 which applies detected analog faults to the fault manager 126. The controller response to each system fault is defined to be either a shutdown response or a non-shutdown response. If a fault can damage the refrigeration system or a perishable load, it would normally be classified as a shutdown response. For example, low compressor oil pressure requires a shutdown.

Generally, the fault manager 126 operates the alarm indicators 94 when faults corresponding to the indicators 94 are detected. Further, digital and analog faults are processed for storage in the E$^2$PROM memory 78 and faults requiring protective control action are applied by the fault manager 126 to the sequencer 122.

The following is a list of two digit codes employed in the system for the various analog and ditial faults. In this case, the fault codes available for display are determined by conventional rear panel jumper settings.

A. Operator Fault Code List

00 No Fault
05 Low Compressor Oil Pressure
06 Evaporator Over temperature
07 Return Air Sensor Faulty
08 Discharge Air Sensor Faulty
09 Controller Out of Calibration
10 High Refrigerant Pressure
11 Temperature Out Of Range
12 Defrost Terminated on Time Limit
13 Pumpdown Terminated on Time Limit

B. Expanded Diagnostic Fault Code List 00 no fault
01 analog channel 0 (reference channel)
01 analog channel 1 (spare 1 channe)
02 analog channel 2 (discharge channel)
04 analog channel 3 (spare 2 channel)
05 analog channel 4 (coil channel)
06 analog channel 5 (calibration channel)
07 analog channel 6
08 hot evaporator
09 high refrigerant pressure
10 low oil pressure
11 out of range
12 out of range above
13 out of range below
14 pumpdown timeout
15 defrost timeout
16 adc failure

C. Faulty Controller Hardware Fault Code List 00 no fault
01 bad check sum
02 calibration state variable out of range
03 e$^2$prom command out of range
04 fault state variable out of range
05 load state variable out of range
06 pretrip state variable out of range
07 pstseq module—virtual state variable out of range
08 pstseq modulate—physical state variable out of range
09 pstseq module—heat check
10 relay module—physical state variable out of range
11 ram test failure
12 select state variable out of range
13 up down state variable out of range
14 external 0 interrupt exception
15 external 1 interrupt exception
16 timer 2 8032 interrupt exception
17 vstseq module—virtual state variable out of range
18 vstseq module—virtual state variable zero
19 vstseq module—end of table found
20 invalid deadman sequence
21 e$^2$prom hardware failure
22 stackpointer bounds overflow fault An E$^2$PROM manager 150 directs data into and out of the E$^2$PROM memory 78. Thus, keypad and system calculated setpoints and system faults are directed into storage as generated. The data manager 150 also produces fault erasures when all the faults are sequenced on the display, a fault code is still displayed and the keypad clear key is pressed. On request, the data manager 150 generates stored E$^2$PROM data. Such data includes logged system temperature data produced by a data logger 152.

A data history is recorded by the data logger 152 in the form of a data snapshot taken each half hour or each hour. The snapshot includes the return and discharge air temperatures, loss of power, operating modes, sensor failure, any new temperature setpoint entered by the operator, and any faults that may have occurred.

The data snapshot history can be accumulated in memory for an extended period of time, in this case up to eighty days requiring about 3.5K storage. This provision is attractive both to the user and to the manufacturer because it provides a management basis for achieving better reliability for the refrigeration system. In addition, it provides a record of cause and effect for establishing responsibility for loss of perishables in instances where a system operating fault causes such a loss.

External communication for the refrigeration control system 120 is provided over a serial channel 154 such as an RS232 link. A serial command processor 156 receives serial commands from the external supervisory computer through a serial receiver-driver 155 and transmits any data requests to the $E^2PROM$ manager 150. Control commands, such as remote setpoint entries, are applied to the state sequencer 122. The setpoint entries specifically are applied to the setpoint calculator 134A.

Data received from the $E^2PROM$ manager 150 under external request is applied by the processor 156 to a serial transmitter driver 157 for transmission to the supervisory computer over the serial channel 154. The normal transmission rate may be 110 baud, but a higher rate such as 4800 baud may be selected when a large block of data from the data log is being transmitted. At the high transmission rate, the control is latched in a safe state, such as null, during the transmission because the heavy transmission load put on the computer duty cycle makes it difficult to achieve effective control during transmission with the capacity limits of the preferred embodiment hardware.

The communication channel can also be employed to provide the user with the capability of making a systematic service check on the refrigeration controller prior to loading and shipment of the refrigeration container. Thus, as one example, the supervisory computer can be in the form of a notebook computer and it transmits a service check request which results in service check commands being applied by the command processor 156 to the state sequencer 122 for an automatic checkout. A special programmed sequence is triggered to step the controller through each operating mode on a timed basis (approximately 30 seconds in each mode). In addition, other exercises can be conducted from the supervisory computer, such as sending a write command to the digital output to disable the sequencer 122 and verify that each control relay is working. Other output devices and input devices and systems can be similarly checked out. In all cases, any faults are recorded and processed for alarm/display by the fault manager 126.

A display manager 160 determines what data is displayed by LED devices 162 by a display driver 164. Keypad entries are processed through the digital input 84. A selection for the temperature sensor that is to be displayed is detected by sensor display selection box 166 and applied to the display manager 160. The available choices are: return air sensor, discharge air sensor, or automatic mode resulting in display of the temperature sensor in use.

A temperature setpoint entry is detected by setpoint routines box 168 which employs routines to generate a keypad setpoint value which is applied to the control loop through setpoint calculation box 134A for control action as previously described. System temperatures generated by the analog input system are converted to a display data form and applied to the display manager 160 by conversion box 170. The keypad includes up and down and enter buttons (not shown) which the operator uses to make temperature setpoint changes.

Fault key routines 172 are employed to decode keyboard fault code display requests and to process requested fault code displays for system faults detected and generated for display by the fault manager 126. The keyboard includes a single button (not shown) for operator requests for fault codes stored in the $E^2PROM$ 78. As the button is successively pressed, the number of the fault in a stored sequential fault history as well as the code number for the fault are displayed until all of the faults stored in the history have been displayed at which time the display is recycled through the fault history if the button continues to be pressed by the operator. Up to nine fault conditions are stored in memory as subsequently considered more fully. The information learned from fault display greatly facilitates the maintenance management of the refrigeration system.

A document containing a fault code table is available to the operator to obtain the definition of a fault from its displayed code. A clear key (not shown) on the keyboard enables the operator to clear stored faults from the fault history and in that case the fault alarm light goes out and the display indicates that the faults have been cleared.

An $E^2PROM$ erase signal is applied to the $E^2PROM$ 150 in order to control the storage of fault code data. Thus, the fault manager 126 directs the storage of successive system faults in time order until the designated storage capacity is filled. In this case, a total of 9 faults can be stored in the fault history, and when each subsequent fault occurs the last fault is erased and the latest fault is stored in its place. As a result, the fault history always shows the oldest fault history and the most recent fault.

Figure 6:
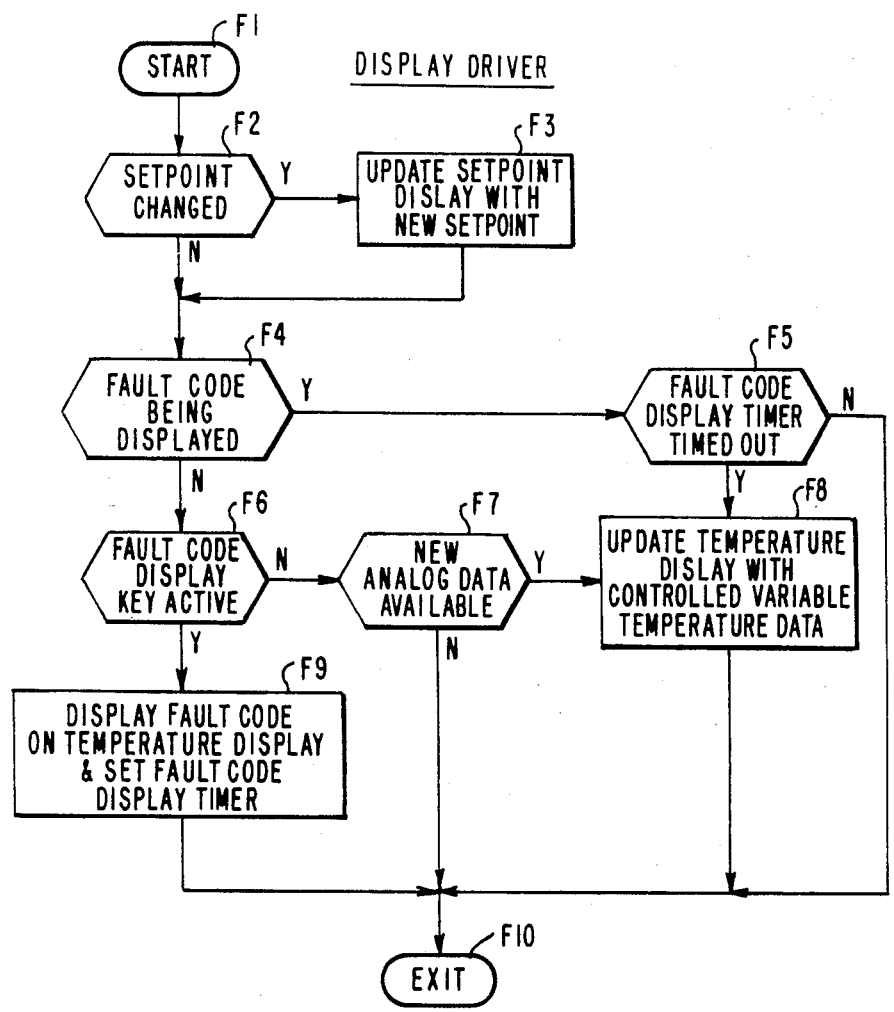
FIGS. 6-9 show flow charts respectively representing control programs employed in the control system to achieve state sequencing, fault management, data storage management and display management.

FIG. 6 illustrates the display driver software routine. This routine displays information for use by the operator.

If the setpoint is modified, the routine updates the value displayed in the setpoint display. If a fault code display is being requested by the operator, a fault code is displayed on the temperature/fault code display. After the fault code has been displayed for a predetermined amount of time, the fault code is erased and the current controlled variable temperature is displayed.

If a fault code is not being displayed, and new analog data is available, the latest controlled variable temperature reading is displayed on the temperature/fault code display.

Figure 7:
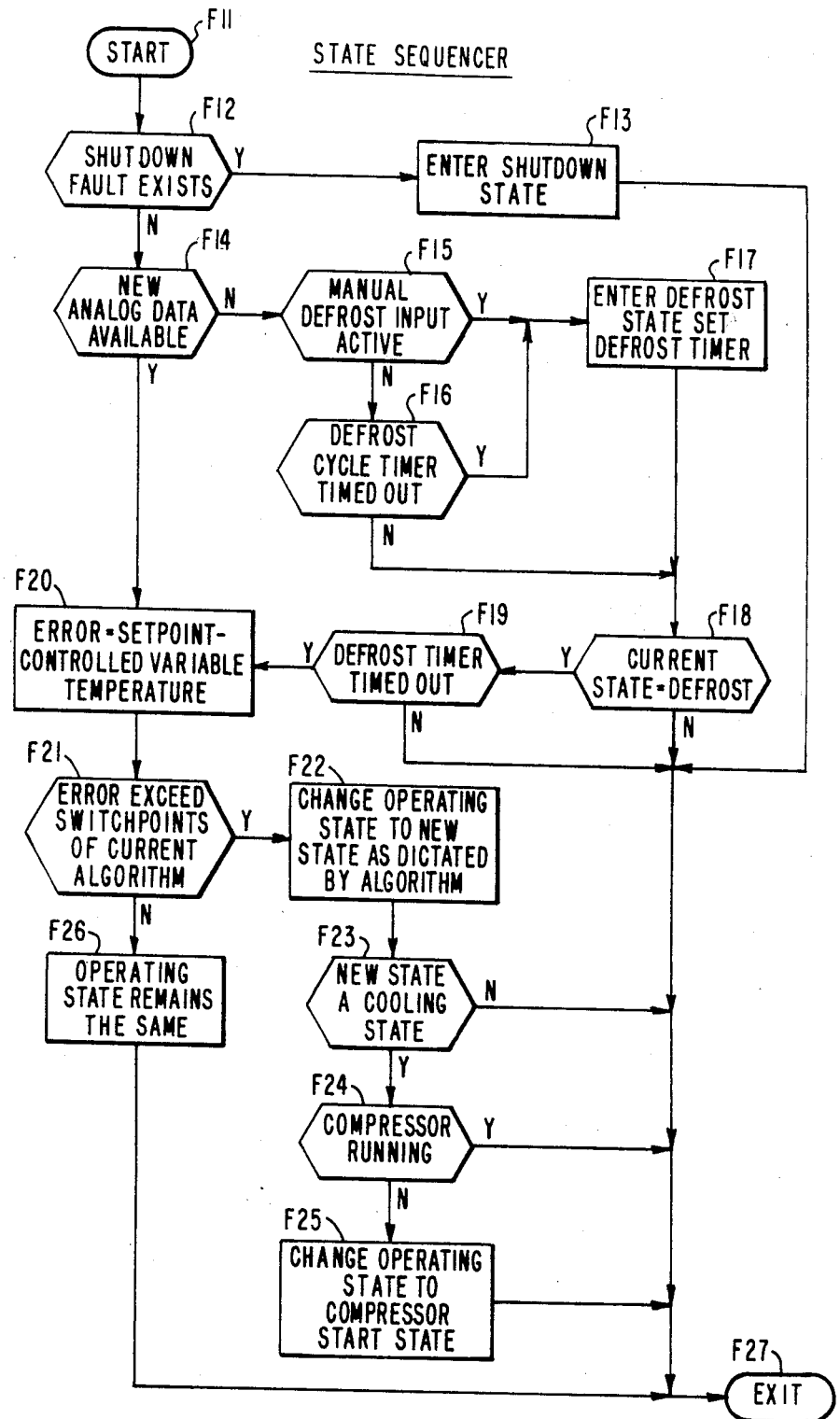

FIG. 7 illustrates the software flow of the state sequencer routine. The routine first checks for a shutdown fault condition by examining the state of a flag controlled by the fault manager. If a shutdown fault condition exists, the controller enters the shutdown state. If no shutdown faults are present, the "new analog data" flag is checked. If there is new analog data available, the control loop is executed. This loop calculates an error signal from the setpoint and the controlled variable temperature reading. The error signal is compared to the switchpoints in the algorithm table, referenced by the current operating state. If the algorithm indicates a different operating state than the current state, the controller changes to the new state. If the new operating state is a cooling state and the compressor is not operating, the current operating state becomes the "compressor start state."

If new analog data is not available, the defrost cycle initiation conditions are checked. If the manual defrost input is active or the defrost timer has time out, and the current state is not defrost, the controller enters the defrost state. If the current state is defrost and the defrost timer has timed out, the controller exits the defrost state and generates a new operating state based on the current error signal.

Figure 8:
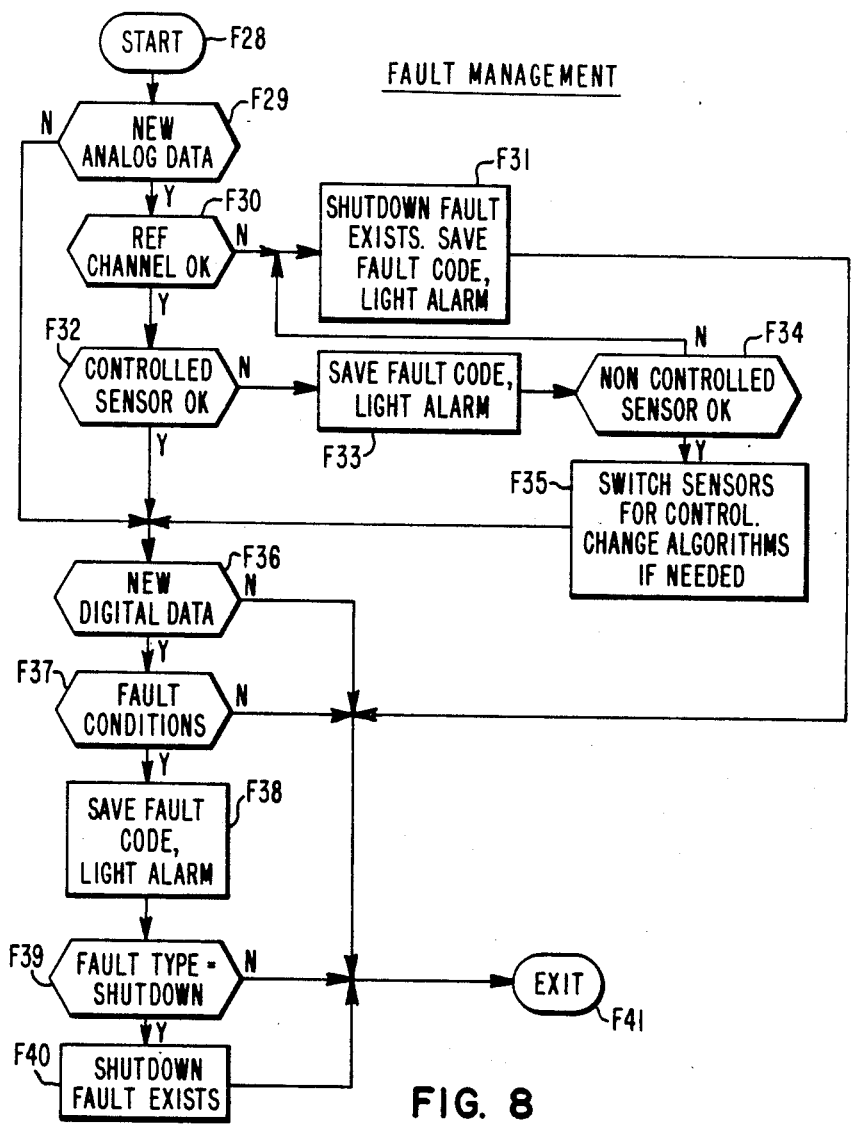

FIG. 8 illustrates the fault management software routine. If new analog data is available, the reference channel is checked for being within a set of predetermined limits. If the reference channel exceeds the limits, a shutdown fault exists.

If the reference channel is within limits, the controlled sensor temperature reading is checked. If it is not within a set of predetermined set of limits, the sensor has failed. A fault code is saved and the controller switches to the other sensor for use as a control sensor. If both sensors have failed, a shutdown fault exists. Upon switching sensors, the controller will automatically switch algorithms to maintain better control of the conditioned space.

If new digital data is available, the controller checks for digital input fault conditions. If any exist, a fault code is saved and if the fault condition is checked if it is a shutdown or nonshutdown fault. If it is a shutdown type, a shutdown fault condition exists.

Figure 9:
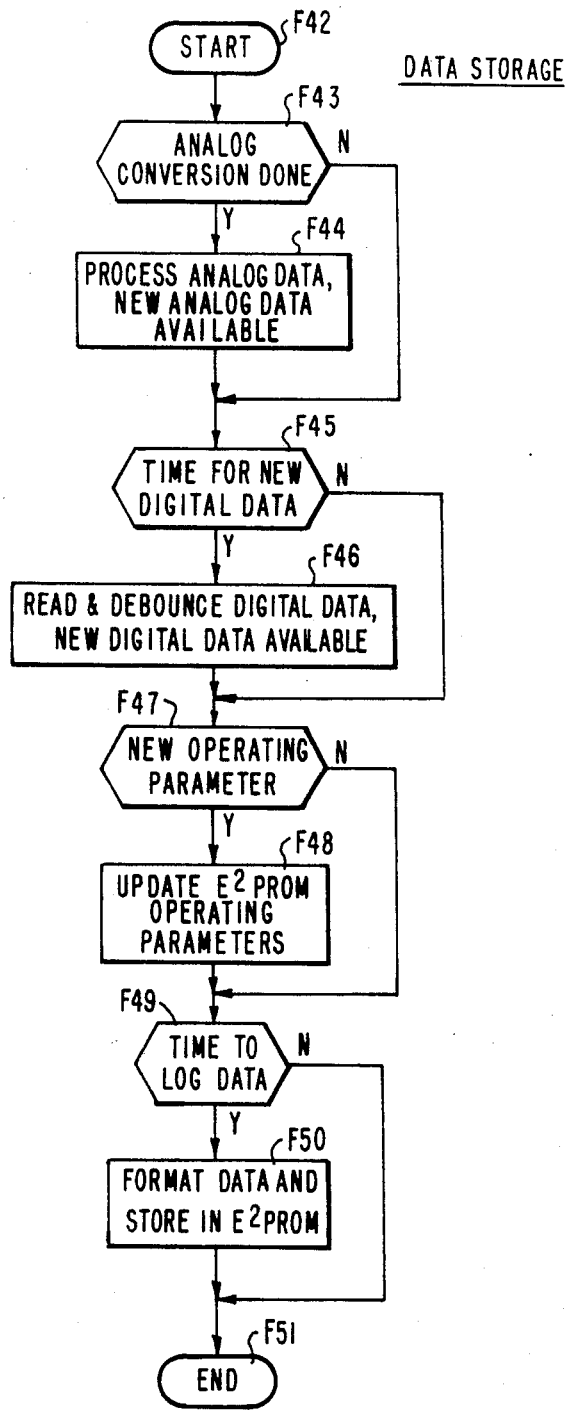

FIG. 9 illustrates the basic data storage functions of the controller software. When an analog conversion is finished, the new data is processed. The processing of analog data consists of averaging the last eight values together and then linearizing the data to account for temperature sensor nonlinearities. A flag is then set to indicate to the other routines in the software that new analog data is available.

A similar method is used to process digital data. At fixed intervals of time, the controller reads in a new set of digital data. The new digital data is then debounced, using standard software techniques, to account for contact closure bounce. A flag is then set to indicate to the system that new digital data is available.

If an operating parameter, such as setpoint, fault conditions, etc., is modified, the controller updates the E$^2$PROM area associated with operating parameters. The E$^2$PROM is also updated if a data logging timer times out. The purpose of the data logging area is to maintain a record of temperatures, fault conditions, setpoint changes, and information about the operation of the system.

What is claimed is:

1. A control system for operating a transport refrigeration system having a motor driven compressor coupled to a condenser and an evaporator and further having heater means so as to cool or heat a served space, said system comprising:
    first and second temperature sensing means for respectively sensing first and second temperatures in first and second different locations of the served space;
    a microprocessor for monitoring and controlling said transport refrigeration system;
    means for coupling said first and second temperature sensing means to said microprocessor;
    means for manually selecting one of said first and second temperature sensing means as an operative temperature sensor;
    means for generating and coupling to said microprocessor an operator selected space temperature set point;
    means for comparing said operator selected set point with the temperature sensed by the operative sensor to provide a difference error;
    operating controls for the compressor motor and the heater means to provide cooling and heating needed for space temperature control;
    means for coupling said operating controls to said microprocessor;
    first and second algorithms which define in accordance with first and second sets of rules, respectively, operating states of said operating controls;
    means for automatically selecting one of said algorithms as the operative algorithm in response to the operative sensor;
    means for operating said microprocessor to sequence or control said operating controls in accordance with said selected algorithm to produce a level of heat transfer to or from the served space on the basis of the level of said difference error;
    means for operating said microprocessor to detect a failure of said operative sensor; and
    means for automatically switching sensors to cause the non-selected sensor to be the operative sensor in determining said difference error and for automatically designating one of said algorithms for continued system sequencing the control in the event said manually selected temperature sensing means is detected to have failed.

2. The control system of claim 1 including an evaporator fan, a condenser fan, and associated fan controls, for the refrigeration system, and means coupling said fan controls to the microprocessor.

3. The control system of claim 2 including means for sensing evaporator coil temperature, and means for operating the microprocessor to sequence and operate the heater means and evaporator fan to drive the refrigeration system through a time limited defrost cycle in response to either the evaporator coil temperature or operator command.

4. The control system of claim 2 including means for operating the microprocessor to sequence and operate the heater means and evaporator fan to drive the refrigeration system through a time limited defrost cycle in response to the evaporator coil temperature or operator command, and means for storing a timed out defrost cycle in a system fault list.

5. A control system for operating a transport refrigeration system having a motor driven compressor coupled to a condenser and an evaporator coil and further having heater means so as to cool or heat a served space, said system comprising:
    temperature sensing means for sensing temperature in the served space;
    a microprocessor for monitoring and controlling said transport refrigeration system;
    means for coupling said temperature sensing means to said microprocessor;
    means for generating and coupling to said microprocessor an operator selected space temperature setpoint;

means for comparing said operator selected set point
with the temperature sensed by said temperature
sensing means to provide a difference error;

operating controls for the compressor motor and the
heater means to provide the cooling and heating
needed for space temperature control;

means for coupling said operating controls to said
microprocessor;

an algorithm which defines in accordance with a set
of rules the operating states of said operating controls;

sequence/control operating means for operating said
microprocessor to sequence or control said operating controls in accordance with said algorithm to
produce a level of heat transfer to or from the
served space on the basis of a level of said difference error between the setpoint and sensed space
temperatures;

means for detecting a status of predetermined refrigerant system parameters, and for coupling corresponding digital and/or analog input status signals
to said microprocessor;

means for operating said microprocessor to generate
a sequential list of coded system faults corresponding to said system parameters and internally generated parameters detected to be in a fault status;

means for operating said microprocessor to trigger a
shutdown of the refrigeration system when any
fault included in a predetermined set of system
faults is detected to have occurred;

nonvolatile read/write memory means for storing
predetermined data including system fault data in
said sequential list;

means for controlling the storage of the system fault
data in said sequential list in said nonvolatile read/write memory means so that at least a predetermined number of latest system faults are stored;

means for operating said microprocessor to display
the codes of the system faults stored in said sequential list in response to an input command so that the
involvement of specific system parameters in any
fault history is made available for maintenance
management purposes.

6. The control system of claim 5 including means for
operating the microprocessor to log preselected data
with preselected frequency for a preselected period,
and means for controlling the storage of said log data in
the nonvolatile read/write memory means.

7. The control system of claim 6 including an external
computer, data link means for the microprocessor, and
means for operating the microprocessor to generate and
transmit log and system fault data to said external computer in response to data requests received from said
external computer over said data link means.

8. The control system of claim 5 wherein the sequence/control operating means includes means for operating the microprocessor in response to an input command to start and operate the controlled refrigeration
system to provide a maintenance checkout prior to
loading the served space.

9. A control system for operating a transport refrigeration system having a motor driven compressor coupled
to a condenser and an evaporator and further having
evaporator and condenser fans and a modulating refrigerant expansion valve and heater means so as to cool or
heat a served space, said system comprising:

temperature sensing means for sensing a temperature
in a first portion of the served space;

a microprocessor for monitoring and controlling said
transport refrigeration system;

means for coupling said temperature sensing means to
said microprocessor;

means for generating and coupling to said microprocessor an operator selected space temperature
setpoint;

means for comparing said operator selected set point
with the temperature sensed by said temperature
sensing means to provide a difference error;

operating controls for the compressor motor, the
fans, the modulating valve and the heater means to
provide cooling and heating needed for space temperature control;

means for coupling said operating controls to said
microprocessor;

a plurality of control algorithms which define in accordance with respective sets of rules an operating
state of each of the operating controls;

sequence and control means for operating said microprocessor to sequence or control the refrigeration
system operating controls in accordance with a
selected one of said plurality of control algorithms
to produce a level of heat transfer to or from the
served spaced on the basis of a level of said difference error;

each of said algorithms defining states of said compressor motor, said fans and said heater means, and
a position of said modulating valve, to produce
modulating, partial or full cooling, or a null condition, or heating, in accordance with a level and sign
of said difference error as defined in its set of rules.

10. The control system of claim 9 including means for
operating the microprocessor to control selection and
switching of the control algorithms to enable the sequence and control means to operate the microprocessor and run the refrigeration system under different sets
of control procedures and/or with different sets of system components.

* * * * *